Nov. 15, 1932.  F. W. L. PEEBLES ET AL  1,888,049
JACK-AND-PARKING MECHANISM FOR AUTOMOTIVE VEHICLES
Filed Nov. 25, 1929   2 Sheets-Sheet 2
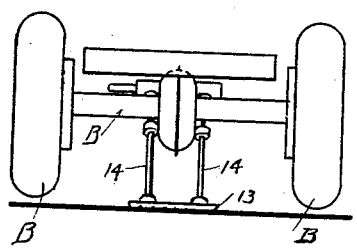
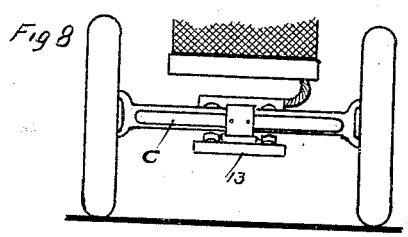
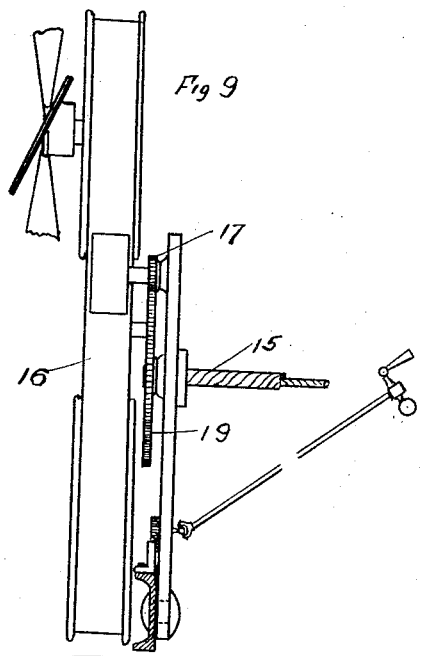
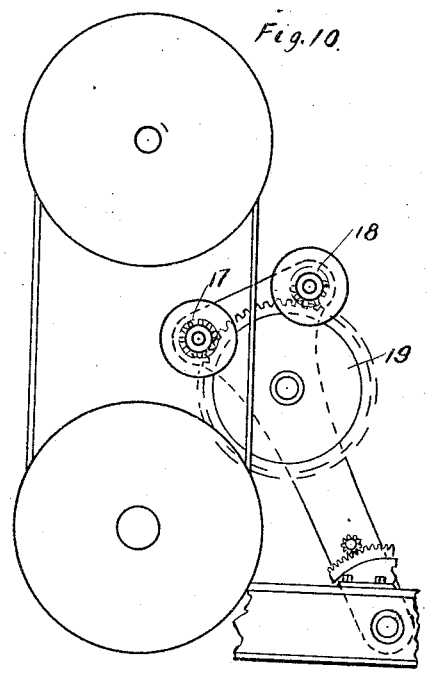
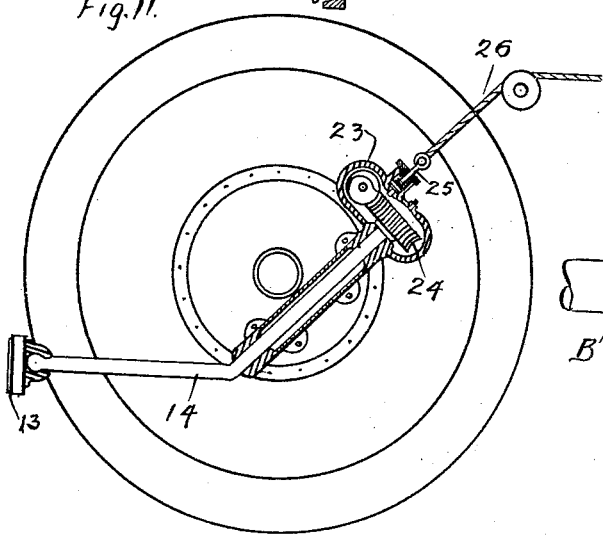
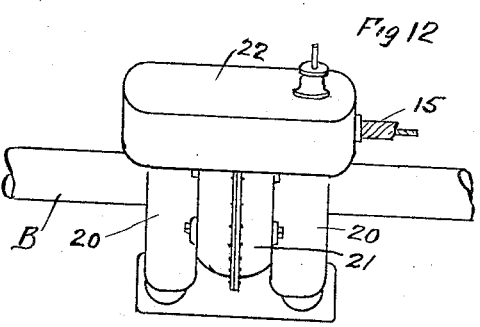
Frank W. L. Peebles, INVENTORS
and Charles W. Baker
BY James L. Hopkins
ATTORNEY Patented Nov. 15, 1932

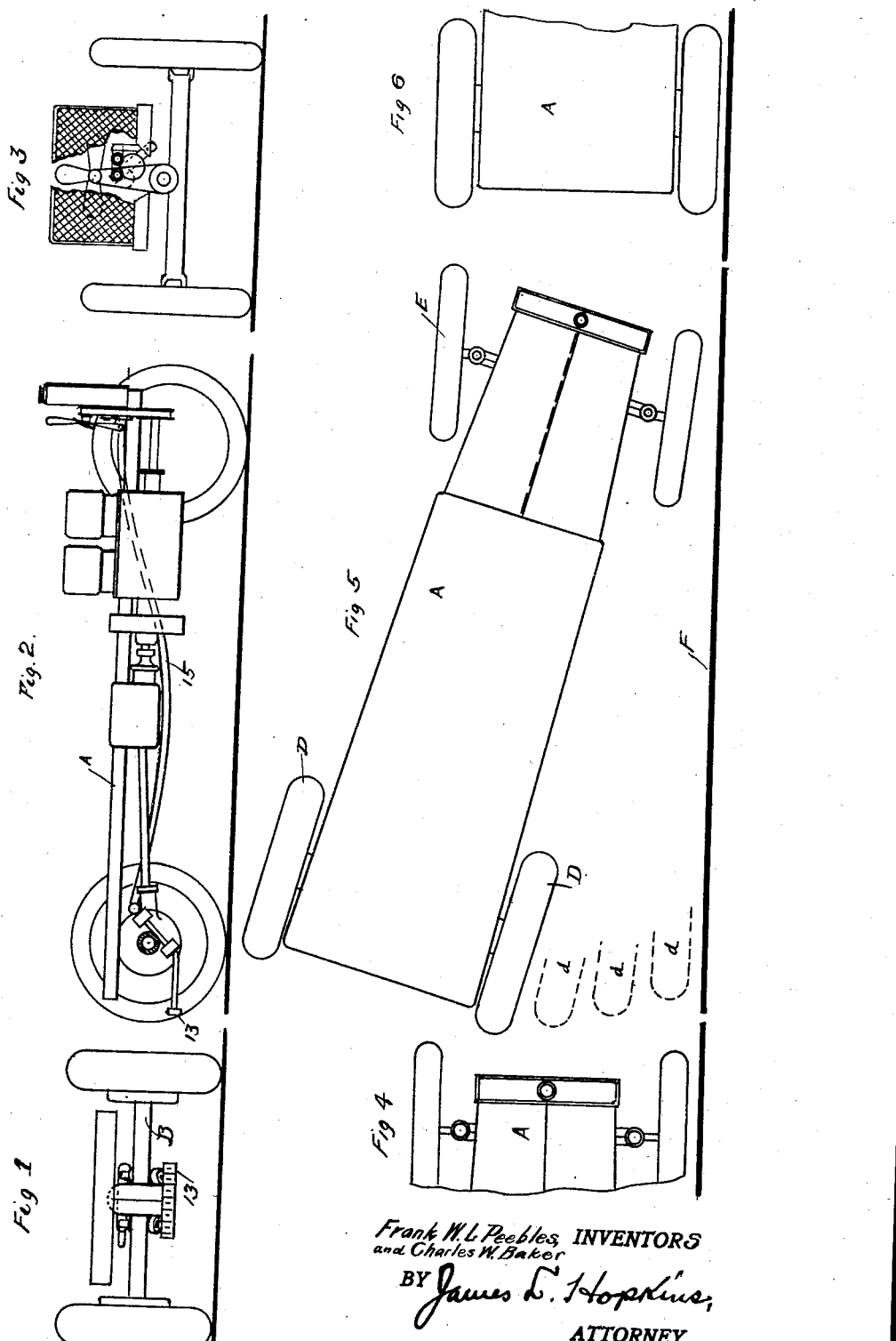

1,888,049

UNITED STATES PATENT OFFICE

FRANK W. L. PEEBLES, OF ST. LOUIS, AND CHARLES W. BAKER, OF LAKE CHARLES PARK, MISSOURI

JACK-AND-PARKING MECHANISM FOR AUTOMOTIVE VEHICLES

Application filed November 25, 1929. Serial No. 409,450.

Our invention relates to an improved jack-and-parking mechanism for automotive vehicles. The mechanism is intended for application to either the front or rear axle, or both, of an automobile or motor truck, and to embody a suitably mounted rotatable shoe, the shoe being arranged to lift the body of the vehicle from the street or other surface whereon the vehicle rests, the shoe then being locked in said jacking position; the mechanism also being capable of imparting a series of step-by-step motions to said shoe, to shift the end of the vehicle to which the mechanism is attached, into alinement with the edge or curb of the parking space. Thus the mechanism serves both as a lifting-jack and a parking device.

Drawings

In the drawings—

Fig. 1 is a rear elevation of a vehicle having the lifting mechanism mounted upon its rear axle.

Fig. 2 is a side elevation of the same.

Fig. 3 is a front elevation of the same illustrating the driving of the rotatable mechanism by the fan-belt of the vehicle.

Fig. 4 is a top plan view of a fragment of the front end of said vehicle in parking position.

Fig. 5 is a top plan view of said vehicle prepared to have its rear end shifted to parked position.

Fig. 6 is a top plan view of a fragment of the rear end of said vehicle in parked position.

Fig. 7 is a rear elevation of said vehicle in elevated position, the mechanism of our invention serving as a lifting-jack.

Fig. 8 is a front elevation of an automotive vehicle having the device of our invention installed upon its front axle.

Fig. 9 is an enlarged detail in side view illustrating the fan-belt of the vehicle being employed to actuate the jack-and-parking mechanism.

Fig. 10 is a transverse view of the assembly illustrated in Fig. 9.

Fig. 11 is a detailed view, partly in section of the portion of the mechanism of our invention carried by the axle.

Fig. 12 is a perspective view of the housing wherein the shoe-actuating mechanism is mounted.

Description

We have illustrated the said device embodying our invention installed upon an automotive vehicle, A. The primary mechanism of our invention comprises a shoe 13 mounted between the projecting ends of the rotatable shafts 14—14. The shafts 14—14 are rotated by any suitable source of power, preferably through the engine whereby the vehicle is propelled. We have illustrated the flexible shaft 15 as being propelled by the fan-belt 16, power being transmitted from the fan-belt 16 to the flexible shaft 15 by means of the idlers 17 and 18, geared to the wheel 19.

The shoe 13 and its operative mechanism are centrally mounted on the rear axle B as shown in Fig. 1, and are actuated through the flexible shaft 15, said shaft 15 being mounted as indicated in Fig. 2. If preferred the shoe 13 and its operative mechanism may be mounted upon the front axle C, as illustrated in Fig. 8. The shoe-carrying shafts 14—14 are mounted in the housing 20—20, the parts of which housing are mounted on the axle B at the sides of the gear box 21. The horizontal housing 22 surmounts the two-part housing 20—20 (see Fig. 12) and receives the terminal end of the flexible shaft 15, the worm 23 being mounted on the end of said flexible shaft 15 and engaging the gear-wheels 24—24, which gear-wheels 24—24 are mounted on the rotatable shafts 14—14. The gear-wheel 24 is locked in operative or inoperative position by means of the plunger 25, which plunger 25 is controlled by a cord 26 running to the instrument board (not shown) of the vehicle. As the shafts 14—14 rotate, they carry the shoe 13 into contact with the surface whereon the vehicle rests, the weight of the end of the vehicle carried by the axle on which the operating mechanism is mounted being transferred from the wheels D—D to the shoe 13, elevating the vehicle from its supporting surface as shown in Fig. 7, at which step in the operation of the shoe 13 its operative mechanism may be locked with the wheels B—B elevated from the supporting surface; our mechanism when so used having the function of a lifting jack.

In parking the vehicle A is initially driven with the front wheels E—E in juxtaposition to the curb line F as shown in Fig. 5, the vehicle coming to rest with its body at an angle to the curb F. Thereupon by applying power to the shoe 13 through the flexible shafts 14—14 the shoe 13 is made to effect a series of contacts with the supporting surface, carrying the rear end of the vehicle A step-by-step toward the curb F, the successive positions of the inner wheel D being indicated in dotted lines d—d—d in Fig. 5, the result being that the rear end of the vehicle A is brought into alinement with the curb F, and in proper parking position as shown in Fig. 6.

Many variations of the described structure, both as to the operative parts of the jack-and-parking mechanism, as well as various means of utilizing power from any suitable source carried by the vehicle, may be effected without departure from our actual invention as defined in the appended claims.

We claim:—

1. In combination with a motor vehicle, a jacking device comprising a lifting lever angularly revoluble through a conical surface, the pivotal point of said lever being disposed with relation to the vehicle so that when in elevated position the lever will be approximately in line with the understructure of said vehicle and when in lowermost position the vehicle will be raised.

2. In combination with a motor vehicle, a jacking device comprising a lifting lever angularly revoluble on an inclined axis through a conical surface, said lever being pivotally mounted on the understructure of the vehicle and disposed with relation to the vehicle so that when in elevated position, the lever will be approximately in line with the understructure of said vehicle, and when in lowermost position the lever will impinge on the supporting surface of the vehicle to elevate the latter, and suitable connection between the lever and motor of the vehicle.

3. In combination with a motor vehicle, a a jacking device comprising a lifting lever angularly revoluble on an inclined axis, the distance from the pivotal point to the free end of the lever being greater than the perpendicular distance from said pivotal point to the plane of the vehicle supporting surface, whereby on revolution of said lever the free end thereof will intersect said plane, and means for actuating said lever.

4. In combination with a motor vehicle, a jacking device comprising a pair of lifting levers mounted in laterally spaced relation on the understructure of the vehicle, a shoe having ball and socket connections with the ends of said levers, and means for revolving said levers in parallelism over conical surfaces having inclined axes, the length of said levers being such that the shoe will impinge on the vehicle supporting surface in its lowermost position and raise the vehicle.

5. In combination with a motor vehicle, a jacking device comprising an inclined shaft mounted on the vehicle chassis, suitable connection between said shaft and the motor for driving the shaft, said shaft having a strut element projecting angularly from its lower end, the length of said strut being greater than the vertical distance from the lower end of said shaft to the normal supporting plane of the vehicle.

6. In combination with an automobile vehicle having the usual engine and power transmission, a jacking device comprising a pair of parallel shafts; a shoe carried by the terminals of said shafts being so mounted upon the vehicle that upon the said shafts being revolved said shoe will periodically be brought into contact with the surface supporting said vehicle; means for coupling at will said parallel shafts to a revoluble element of the engine or transmission whereby during said periodic contact with the vehicular supporting surface one end of the vehicle will be moved by a lateral step-by-step motion in the right or the left direction as desired.

In testimony whereof we have hereunto affixed our signatures.

FRANK W. L. PEEBLES.
CHARLES W. BAKER.